Feb. 21, 1956
D. E. WEISS ET AL
2,735,795
METHOD AND APPARATUS FOR COUNTERCURRENTLY
CONTACTING SOLIDS WITH LIQUIDS
Filed Feb. 25, 1953
2 Sheets-Sheet 1
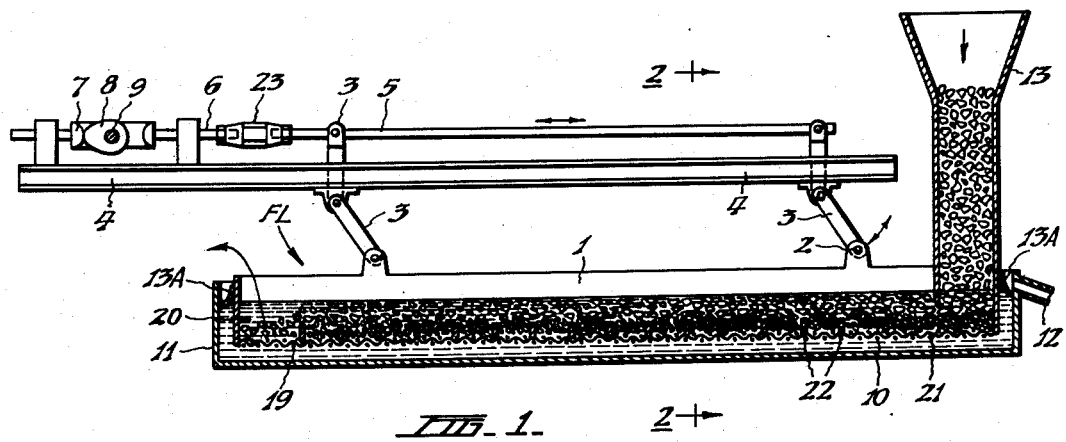
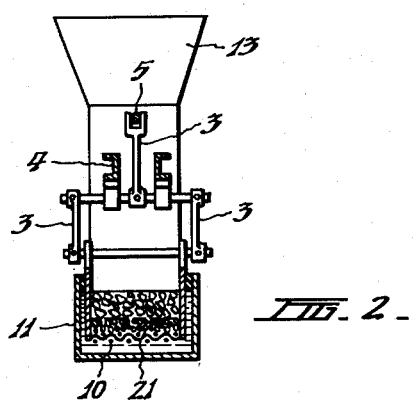
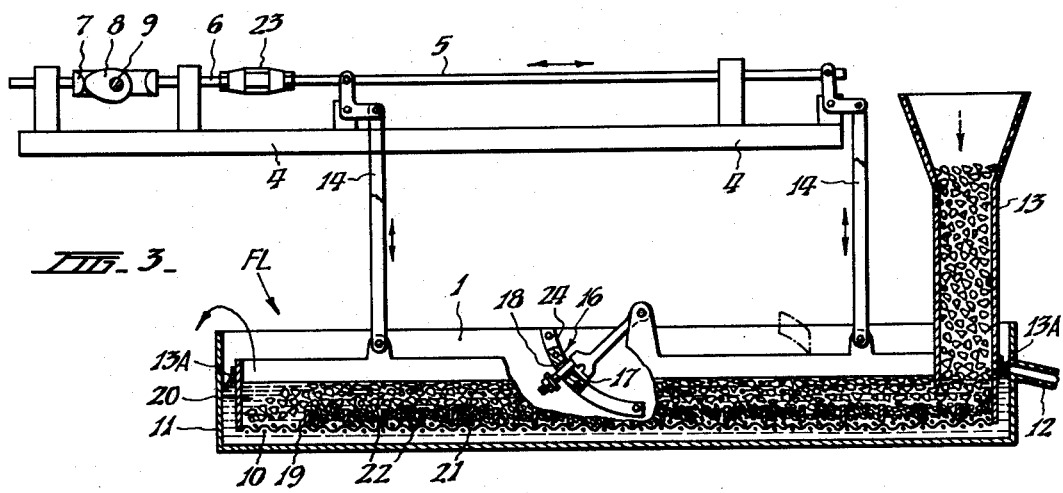

United States Patent Office 2,735,795
Patented Feb. 21, 1956

2,735,795
METHOD AND APPARATUS FOR COUNTERCURRENTLY CONTACTING SOLIDS WITH LIQUIDS

Donald Eric Weiss, Blackburn, Victoria, and Everard Arthur Swinton, Mount Eliza, Victoria, Australia, assignors to Commonwealth Scientific and Industrial Research Organization, East Melbourne, Victoria, Australia, a body corporate Application February 25, 1953, Serial No. 338,822

Claims priority, application Australia April 7, 1952

10 Claims. (Cl. 134—25)

This invention relates to an improved method and apparatus for obtaining continuous countercurrent contact between a granular solid and a liquid.

Various methods have been employed to bring solid particles and liquids into effective contact. Frequently a continuous process is desirable but a simple and effective large scale method of obtaining countercurrent flow in solid-liquid systems has not been devised with the exception of that forming the subject of our prior United States patent application Serial No. 308,842 which is mentioned subsequently herein.

The simplest method of obtaining countercurrent flow is to allow solid particles to fall freely through a rising column of liquid but the turbulence created by the falling particles creates back-mixing which tends to counteract the countercurrent action, and adequate contact times can only be obtained by the use of excessively long columns. With a view to overcoming these difficulties various moving bed techniques have been devised.

One such moving bed countercurrent system employs a vertical tower containing a compact bed of granular solids which is permitted to flow as a compact mass down the column against a rising liquid stream. Although this technique is satisfactory for use in towers of small cross-sectional area, considerable difficulties occur when larger towers are employed, since it is difficult to withdraw the solids uniformly over the whole cross-sectional area of the bottom of the tower, and this results in non-linear solid movement throughout the tower. If finely divided particles are being treated channeling often occurs with the result that the liquid flow is uneven.

The fluidized solid technique has been proposed for obtaining such countercurrent flow. This technique is based on the fact that when a solid of suitable particle size is added to a liquid stream which is flowing upwards at a velocity just less than the free settling rate of the solid a fluidized solid phase is formed. Since this phase is turbulent and can be handled as a liquid the movement of the solids is thus simplified.

Prior to this invention all fluidized solid-liquid systems have employed continuously rising liquid streams. A number of difficulties are associated with this type of operation particularly if it is used to obtain countercurrent contact between an adsorbent and a liquid phase where sufficient contact time must be allowed for adsorption to occur. The contact time is limited by the high liquid flow velocity necessary to maintain fluidized conditions. Thus only very low contact times can be obtained unless recirculating pumps are used to recycle the liquid. This is undesirable on account of the expense involved and is especially so in multi-stage processes where inefficiencies also arise because of considerable liquid short-circuiting between the circulating streams. Also, because of the highly turbulent condition in the fluidized solid phase a certain amount of solid short-circuiting occurs whereby some particles spend considerably less than the average time in effective contact with the liquid. This also results in inefficiencies.

Thus, although the fluidized solid technique enables solids to be moved countercurrently to liquids in large scale apparatus, the known apparatus and procedures, with the exception of those forming the subject of our prior United States patent application Serial No. 308,842, do not allow the independent control of solid-liquid contact time that is possible with compact non-turbulent moving bed systems.

According to the invention forming the subject of our said prior application a pulsating rather than a continuous stream of liquid is used to contact the solid particles. Since the pulsations result in a cycle of increasing liquid velocity followed by a decreasing one, fluidization can be obtained without any net liquid flow through the apparatus, provided that the pulsations are of sufficient magnitude. This procedure enables a fluidized bed process to be operated under conditions where the liquid-solid contact time can be varied independently of the conditions required for fluidization. Further advantages also follow. The upward pulse causes the fluidization of the particles while the downward pulse results in complete or partial settling. Hence the particles are prevented from travelling far at each pulsation cycle. This eliminates the violent solid mixing and short circuiting which characterises conventional fluidized systems.

It is also a difficult matter to withdraw or add liquid uniformly over the whole cross-sectional area of a conventional solid-liquid contacting apparatus. This is a particular disadvantage in some types of fractional adsorption processes where pH or other concentration gradient is to be maintained and where it is highly advantageous to be able to add easily acid, alkali or other reagent at a number of different points in the adsorption column. In this type of operation it would be advantageous to be able to withdraw, at any point in the column, a sample of the adsorbent for control testing purposes but this cannot be done simply with conventional equipment.

In procedures of this nature for fractional adsorption or countercurrent leaching where mass-transfer occurs between the solid and liquid phases a number of factors limit the rate of transfer. If the solid particles are sufficiently small so that diffusion of solute through the liquid film surrounding the solid particles is the rate-controlling step an increase in the relative velocity between the moving particle and the liquid will considerably increase the mass-transfer rate. However, in some systems, particularly fractional adsorption processes employing reflux, the concentration of solute desired in the liquid stream in contact with the solid determines the volume of solvent that can be used and hence fixes the relative flow velocity between the two phases. Mass-transfer rates and the throughput of the apparatus are therefore limited by these conditions. In systems of this type the use of a pulsating rather than a continuous liquid stream as described in the specification of our said prior application, results in a considerable increase in the relative liquid-solid velocity and therefore in the mass-transfer rates.

In other systems diffusion within the solid phase is the rate determining step. Mass-transfer rates can be increased under these conditions by decreasing the size of the particle but a practical limit is set for moving bed and fluidized bed operations since the sedimentation velocity of the particles must exceed the rising liquid velocity.

Although the particles in a fluidized bed are in a highly turbulent condition the relative velocity between the moving liquid and solid is not necessarily high as compared with those obtainable in fixed bed operation. Further the bed of particles is in a highly expanded state so that the number of particles per unit volume of liquid is lower than in fixed bed operation. Both of these factors result in mass-transfer rates for fluidized adsorbent or leaching operations that are lower than those attainable in fixed bed operation providing the rate-determining factor is diffusion across the liquid film.

An object of this invention is to provide a method and apparatus whereby particles, provided that they are of sufficient size to be retained above a porous partition or bed of solids, may be positively and uniformly moved countercurrently to a liquid stream at a rate which is independent of the net liquid flow rate throughout the apparatus and at a rate which is independent of the sedimentation velocity of the particles.

Another object is to provide a continuous countercurrent contacting procedure for solids and liquids which enables the relative velocity between the particles and the liquid to be adjusted independently of the net liquid flow throughout the apparatus.

Another object is to provide a continuous countercurrent contacting procedure for solids and liquids which provides uniform distribution of solid and liquid at every transverse section of the contacting zone of the apparatus.

Another object is to provide a procedure which enables the addition or withdrawal of liquid or solid to be made simply and conveniently at as many points in the apparatus as are desired.

Another object is to provide a procedure in which the bed of particles is readily accessible for purposes of inspection, cleaning or clearing.

Another object is to provide a procedure which is not susceptible to blockages arising from the presence of colloidal or very finely divided suspended matter in the liquid phase and which permits the countercurrent contact of one solid with a slurry of other very finely divided solids suspended in a liquid.

Another object is to provide a continuous countercurrent contacting procedure for solids and liquids which enables simultaneous contact with liquid of two or more different solid species differing in their sedimentation velocities and which enables the particles to be withdrawn as separate streams after such liquid contact.

In accordance with the present invention, continuous countercurrent contact between solid particles of the range of size specified and a liquid or slurry is obtained by introducing liquid into an apparatus having an upper and a lower compartment separated by a screen and withdrawing the liquid from the apparatus in such a way that the liquid flows longitudinally through the apparatus and continuously inundates the screen, feeding solid particles to one compartment at a position longitudinally apart from that at which the liquid enters the apparatus and removing the solids from said one compartment at a point longitudinally apart from that at which the solids are fed into the apparatus, causing the solid particles to traverse the screen in a direction opposite to that of the overall flow of the liquid and continuously contacting the solid with the liquid by effecting a relative motion between the screen and said one compartment such that, in one direction of movement of the screen, the liquid passes steadily through the screen and, in the other direction of movement of the screen, the liquid surges suddenly through the screen, said relative motion including a vertical and a horizontal component, a sufficiently close seal being maintained between the relatively movable abovementioned parts of the apparatus to ensure adequate movement of the liquid through the screen, and the range of size of the solid particles being such that, on the one hand, they are unable to pass through the hole in the screen, while on the other hand, the sedimentation velocity of the solid particles is not so high that the surge of liquid through the screen cannot expand the bed of solid particles.

In carrying out this invention, the upper compartment may carry the screen and be movable while the lower compartment is stationary; or the lower compartment may be movable while the upper compartment and the screen are stationary; or again the screen may be movable in relation to the two compartments, which preferably are stationary and which may be merely the upper and lower portions of a single container.

It is only necessary that there be a relative movement between the screen and the lower compartment so that the compartment stated to be stationary need be merely relatively stationary.

Means may be provided for independently controlling the extent of the upward and downward movement and the extent of the backward and forward movement, thus regulating the rate of the movement of the solid and also determining the upward and downward velocity of the liquid through the solid bed.

More even distribution of liquid passing through the screen to make contact with the solid may be attained, if desired, by means of a bed of particles having a sedimentation velocity in excess of that of the particles to be contacted, said bed being placed above the screen, or between two screens, but beneath the moving solids and its longitudinal movement being restrained by transverse partitions. Alternatively, a number of layers of perforated plates or sieve plates may be used in place of a bed of solids to promote even liquid distribution.

If desired the moving compartment may be sealed to the stationary compartment, or in the case of a moving screen the latter may be sealed to the stationary compartment by means of a flexible bellows or diaphragm.

The method may be adapted for handling solids lighter than the liquid by modifying the procedure such that the solids are retained in a lower compartment beneath a screen and are contacted with liquid passing through the screen from an upper compartment.

The procedure according to this invention may be used for countercurrently contacting liquid with a mixture of solid species which differ in their sedimentation velocities. The solids will segregate into different layers and, after being contacted with liquid, may be withdrawn as individual streams of the various solid species.

The accompanying drawings show diagrammatically a suitable construction of apparatus for use in practicing the method according to this invention and variations of that apparatus. In these drawings:

Figure 1 is a longitudinal vertical section through one form of apparatus;

Figure 2 is a cross section on the line 2—2 of Figure 1;

Figure 3 is a longitudinal vertical section through a modified form of the apparatus;

Figure 4:
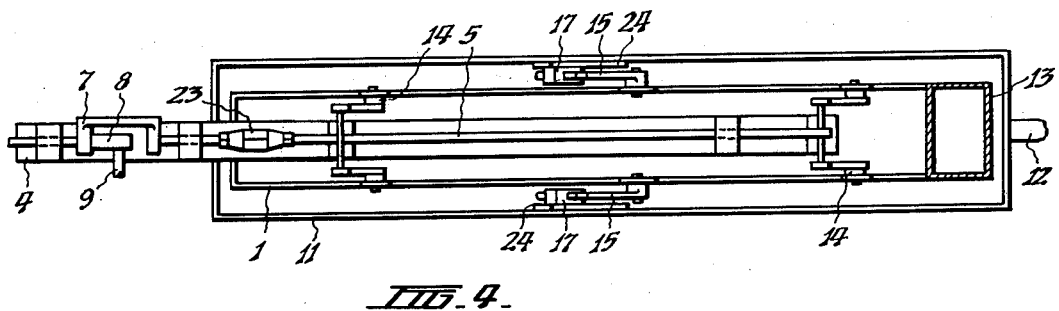
Figure 4 is a plan of the apparatus shown in Figure 3.

In one form of the apparatus (Figures 1 and 2) a long box 1, which is narrow compared with its length, is suspended by pivots 2 from inclined bell cranks 3 pivoting on a rigid frame 4. The bell cranks are themselves connected by a connecting rod 5, and a second connecting rod 6 which, by means of a cam follower 7, bears on a cam 8 attached to a rotating shaft 9. The shape of the cam is such that the box is steadily lifted and then sharply dropped under its own weight at a rate such as 60–200 strokes per minute. The bottom of the box is a perforated plate or other screeen 10 and the box moves within a stationary trough 11. Feed liquid FL enters this trough at one end and leaves the trough at the other end over a weir 12 whose height determines the liquid level in the apparatus. A volume of liquid approximately equal to that entering the system therefore leaves via this weir there being no other liquid exit from the apparatus although some liquid will leave with the removed solids. The solid particles to be contacted with the liquid are fed on to the screen plate through a hopper 13 at the end remote from the liquid feed inlet. As the screen box drops in the liquid in the trough, liquid rapidly surges up through the screen and fluidizes the particles. For this to be effective it is essential that the clearance between the walls of the trough and the screen box be as small as possible, the end clearances being taken up by flexible rubber flaps 13A. Since the screen box is pivoted on bell cranks set at an angle from the horizontal, as it drops it also swings forward carrying the bed of solids with it. As the box continues to swing, liquid surging up through the screen fluidizes the bed of solid particles as previously stated. Thus when the box reaches the end of its stroke and commences to rise upwards and backwards the bed of particles continues forward under its own inertia until the particles settle as a compact bed upon the screeen a little in advance of their previous position.

Figure 5:
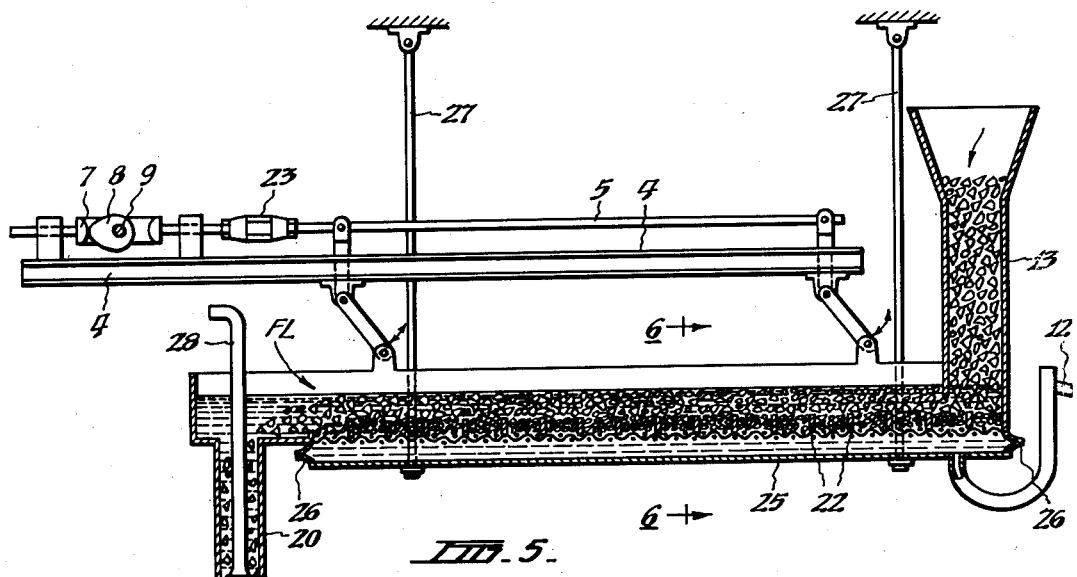
Figure 5 is a longitudinal vertical section of another modified form of the apparatus.
Figure 6:
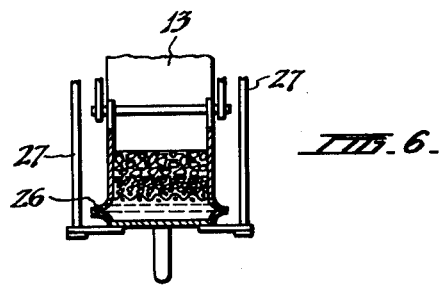
Figure 6 is a cross section on the line 6—6 of Figure 5.

An alternative method of propelling the solid particles utilizes lifting links 14 (Figure 3) to lift the screen box 1 and a radius link 15 with a shifting fulcrum 16. At the commencement of the downstroke the screen falls freely for up to approximately ⅛" on to the bearing plate 17, thus causing the bed to be fluidized by the upward surge of liquid through the screen. The screen box then continues to swing about this fulcrum and thus moves backwards under the fluidized bed. At the commencement of the upstroke the screen box is first lifted substantially vertically, the pivot point being transferred from the bearing plate 17 to the bearing plate 18, and then swings upward and forward carrying the bed with it. Hence all the particles move along the screen plate at a rate which depends on their inertia, the frequency of cycling, and the amplitude of the longitudinal movement of the screen. The alternate periods of partial settling and mixing ensure even particle and liquid distribution. The liquid is also moving constantly upward and downward through the bed of solids. The solids may leave the screen compartment by spilling over a weir 19 into a sump 20 at the end of the screen compartment but beneath the maximum liquid level. It may be pumped as a slurry from this sump by a liquid ejector, air-lift, circulating liquid stream, bucket elevator, screw elevator, rakes or other standard devices for moving solids. An example of such an air-lift is shown in Figure 5, in which the slurry is floated up through a column 28 from a sump 20 by air bubbles introduced through a jet 29.

A layer 21 of solid particles termed "ragging" having a sedimentation velocity considerably greater than that of the particles to be contacted can be placed above the screen plate. The bed of ragging must be retained on the sieve by means of a series of transverse partitions 22 which prevent it moving along the screen plate with the feed particles. Galena, magnetite, emery or quartz sand are examples of some solids than can be used for ragging. The ragging may serve two purposes. It promotes even liquid distribution throughout the screen area and, if its specific gravity is greatly in excess of that of the particles being contacted and its particle size is not too different from that of the feed solid, it functions as "heavy media" preventing the particles from coming in contact with the screen. The latter factor is of importance when the particles have a tendency to clog the screen. If the ragging particles are a little bigger than the feed particles, they will still function as heavy media for the latter and a screen mesh can be used which can retain the ragging but which would be too coarse to retain the feed particles themselves. This allows the apparatus to handle particles having a mesh size which is smaller than would be needed in the absence of ragging and is for example of importance when adsorbing or leaching under conditions where diffusion in the solid phase is the step determining the overall mass-transfer rate. An alternative means for obtaining more even liquid distribution is to use a number of layers of wire screen in place of one single layer.

It is desirable that means be provided for varying the operating conditions of the apparatus to suit individual feed mixtures. For example in the first apparatus described a turnbuckle 23 or comparable arrangement can be provided to shorten or lengthen the connecting rod joining the cam follower to the bell cranks. Lengthening this will alter the arc of the circle over which the bell cranks operate, and increasing the lift of the box but decreasing the throw will reduce the movement of particles throughout the apparatus. The length of the lift can be increased by increasing the length of the arm of the bell crank connected to the cam or by altering the throw of the cam. In the case of the alternative mechanical means of providing the motion the adjustment may be effected by altering the relative position of the shifting fulcrum 16 of the radius link 15 to another position upon a quadrant 24.

In a further modification (Fig. 5) the screen box 1 is sealed to a base plate 25 by means of a flexible diaphragm 26, thus forming a bottom compartment. In order to eliminate twisting of the diaphragm it is desirable to suspend the bottom plate on long hangers 27 to allow it free motion in the horizontal plane but to limit its vertical motion. The diaphragm prevents leakage of liquid from the bottom compartment and so increases the liquid pulse velocity in the screen box.

Contacting apparatus working on these principles possess a number of important advantages as compared with previously described devices.

Since the liquid-solid relative velocity depends only on the number of cycles per unit time and their amplitude, it is independent of the net liquid flow rate through the apparatus. Hence small volumes of concentrated solutions may be handled as readily as dilute solutions at the same relative velocities. Because of the rapid pulsating nature of the contacting liquid this relative velocity and hence mass-transfer rates for liquid diffusion controlled systems are of a higher order of magnitude than generally encountered in standard equipment.

The solids advance through the apparatus because of their inertia and that of the liquid suspending them. Particles can therefore be moved at a rate which is substantially independent of the liquid flow rate through the apparatus and which is determined by the length of longitudinal movement of the sieve plate. The motion of the liquid is such as to promote even solid-liquid distribution across each transverse section of the sieve box. This eliminates the troubles arising from "bridging" and "channelling" in conventional moving bed equipment. It also makes it easy to add or withdraw liquid at any point in the solid bed and only simple distributing systems are needed. The movement opposes the formation of non-moving aggregates so resulting in a linear flow of solid through the apparatus. It also tends to keep the sieve plate itself free of accumulated debris and enables a slurry of very finely divided solids, such as slaked lime, to be contacted with a solid.

The way in which the apparatus can be used to take advantage of these properties is best illustrated by a series of examples which however should not be regarded as restrictive.

*Example 1.*—The apparatus may be used for water softening by the "ion-exchange" process in which calcium ions are removed from a hard water and replaced by sodium ions on contact with an ion-exchange resin. The hard water is passed countercurrently to the sodium form of an ion-exchange resin in one apparatus and emerges as softened water. Since this process is generally one in which the rate-determining step is diffusion within the liquid phase it would be advantageous to use the closed pressurized type of apparatus. The calcium resin emerging from this unit is then regenerated in a second unit by a counter-current stream of brine (e. g. 15% sodium chloride). This should be added at an intermediate point in the resin bed and could be added from a spray or a flow distributing weir. It should be added at a strength greater than that required in the apparatus where it is diluted by a wash stream of water flowing countercurrently to the resin from the other end. The diluted brine, partly converted to calcium chloride, emerges over an overflow weir at the resin feed end of the apparatus and the resin having been regenerated and then washed and dewatered is recycled to the water exhaustion unit. Since the rate of the regeneration process is usually governed by the rate of diffusion within the resin phase it is advantageous to use as finely divided a resin as possible and a ragging such as emery or sand could be used as a flow distributing device and "heavy media." Identical methods of operation apply to all other ion-exchange applications.

*Example 2.*—The following is an example illustrated by a procedure for the manufacture of caustic soda in which it is desired to directly contact one solid with a slurry phase. An ion exchange resin is first converted from the calcium to the sodium form by contact with a brine solution as in Example 1. The sodium resin is then countercurrently contacted with a slurry of slaked lime in a similar apparatus. A mixture of sodium hydroxide and unreacted lime results. Due to the high hydroxyl ion concentration the concentration of calcium ions in the sodium hydroxide solution will be low so that the precipitated lime may be settled and filtered from the sodium hydroxide solution and recycled.

*Example 3.*—The process may be adapted for use in "mixed bed" water deionization as follows. In this process water is demineralized by simultaneous contact with a resin in the hydrogen form and one in the hydroxyl form. The resins used must be such as to function at the same exchange rates and the mixtures in general use usually differ in their sedimentation rates. If such a resin mixture is fed into the apparatus of this invention it will segregate into two distinct layers because of their different sedimentation velocities. This will not materially effect the ion exchange equilibrium since the hydrogen ions liberated in one point of the bed will be mixed and neutralised by the hydroxyl ions emerging from the other point of the bed during the fluidization cycle. The exhausted resin layers may be separately withdrawn after contact by means of a suitable arrangement of weirs. The lower layer is then sent to one regeneration unit which would be similar to that described in Example 1 but using a different regenerant. The upper layer is sent to a second regeneration unit. The regenerated resins are then remixed and fed to the exhaustion unit.

*Example 4.*—The method may be applied to continuous fractional adsorption processes as follows. An adsorbent is passed through the apparatus countercurrently to a solvent stream. At an intermediate point in the system a feed mixture in a solvent is introduced. The adsorbent, moving countercurrently to this mixture strips it of more strongly adsorbed components, so that a solution emerges at the adsorbent feed end of the system which is enriched with respect to the least strongly adsorbed components. At the stripping end of the apparatus the adsorbent is stripped of its adsorbate by a countercurrent stream of stripping solvent which returns the solute back along the bed in the solvent and mixes with the feed mixture. As a result the solvent in the stripping section becomes enriched with respect to the more strongly adsorbent component. Part of the solution of this component is withdrawn from the bed as the product stream. The adsorbent after washing with a suitable solvent miscible with the stripping and feed solvent is recycled to the other end of the apparatus. This example illustrates how the apparatus may be adapted for use in a countercurrent system which involves the entry of three liquid streams and the withdrawal of another. In some operations of this nature for the fractionation of mixtures of weak electrolytes such as penicillin, a solution of an acid or alkali is used as the stripping solvent. In these particular systems it is advantageous to add the stripping solvent at a number of points in the stripping section rather than at one point since it enables a more gradual pH gradient to be obtained. This is of special importance when processing acid or alkali labile materials, such as penicillin. Such multiple point additions, which are difficult to achieve in standard equipment, are achieved simply in this invention by providing a solvent flow distributing weir above the adsorbent bed in the stripping section. Since samples of adsorbent and solvent may be withdrawn at any point in the bed, the control of the process by pH or other measurements is greatly simplified.

The method is therefore applicable to a wide variety of applications which in addition to those analogous to the above examples comprise catalyst-liquid contacting operations, mineral leaching processes such as the leaching of roasted alunite for example, and general extraction operations such as the solvent extraction of vegetable oils from seeds and other substances.

The apparatus used in connection with this method is based on the general principle of the Hancock jig which was used for ore dressing, but the method of operation of the Hancock jig is radically different from that of this invention. In the Hancock jig ore is treated co-currently with large volumes of water, the concentrate being drawn through the beds of ore and ragging and the screen and being collected in a series of underlying hutches as distinct from this invention where the bed of solids is completely retained above the screen and is treated countercurrently with a liquid stream.

As explained above, the liquid which is introduced into the apparatus may be a single liquid or several liquids or a slurry of very finely divided particles suspended in a liquid but each of these alternative forms behaves as a liquid in its application to the method forming the subject of this invention and in its overall physical characteristics is in fact a liquid; consequently, the term "liquid" is used in the following claims to embrace any one of these three alternative forms.

We claim:

1. A method of obtaining continuous countercurrent contact between solid particles and liquid, which comprises the steps of introducing liquid into, and withdrawing the liquid from, the opposite ends of an apparatus having an upper and a lower compartment separated by a screen so that the liquid flows longitudinally through the apparatus and continuously inundates the screen, feeding in solid particles to one compartment at a position longitudinally apart from that at which the liquid enters the apparatus and removing the solid particles from said one compartment at a point longitudinally apart from that at which the solids are fed into the apparatus, causing the solid particles to traverse the screen in a direction opposite to that of the overflow of the liquid and continuously contacting the solid with the liquid by effecting repeated relative motion between the screen and said one compartment such that, in one direction of movement of the screen, the liquid passes steadily through the screen and, in the other direction of movement of the screen, the liquid surges suddenly through the screen into said one compartment, said relative motion including a vertical and horizontal compartment, a sufficiently close seal being maintained between the relatively movable screen and said one compartment of the apparatus to ensure adequate movement of the liquid through the screen, and the range of size of the solid particles being such that, on the one hand, they are unable to pass through the holes in the screen, while on the other hand, the sedimentation velocity of said solid particles is less than the velocity at which the liquid surges through the screen, the frequency of the repeated relative motion between the screen and said one compartment being selected so that non-turbulent fluidizing of the bed of solid particles results.

2. A method of obtaining continuous countercurrent contact between solid particles and liquid comprising the steps of introducing liquid into, and withdrawing the liquid from, the opposite ends of an elongated apparatus having an upper and a lower compartment separated by a screen so that the liquid flows longitudinally through the apparatus and continuously inundates the screen to a substantial depth, feeding solid particles to the upper compartment at a position longitudinally apart from that at which the liquid enters the apparatus and removing the solid particles from the upper compartment at a point longitudinally spaced from the position at which the particles are fed to the apparatus, effecting repeated relative movement of the screen and the lower compartment along a path having a vertical component and a horizontal component so that, during upward movement of the screen relative to the lower compartment, the liquid passes downwardly through the screen to settle the solid particles on the latter and, during downward movement of the screen, the liquid surges upwardly through the screen to fluidize the solid particles, while the horizontal component of the relative movement causes the solid particles to traverse the screen in a direction opposite to the general direction of the flow of liquid through the apparatus, maintaining a close seal between the screen and the lower compartment to ensure adequate movement of the liquid through the screen, the range of size of the solid particles being such as to prevent the passage thereof through the screen openings while having a sedimentation velocity which is sufficiently small to ensure expansion of the bed of solid particles on the screen by the surge of liquid through the latter, the frequency of the repeated relative movement of the screen and lower compartment being selected so that non-turbulent fluidizing of the bed of solid particles results.

3. Apparatus for obtaining continuous countercurrent contact between solid particles and a liquid; said apparatus comprising a longitudinal housing having a screen therein dividing the housing into an upper and a lower compartment, means introducing a liquid into said housing at a first location along the length thereof, means withdrawing the liquid from said housing at a second location spaced longitudinally from said first location and at a rate sufficient to provide a continuous flow of the liquid from said first to second location while maintaining a level of liquid in the housing which inundates said screen to a substantial depth, means continuously feeding solid particles to said upper compartment at a third location spaced longitudinally from said first location in the direction toward said second location, means for withdrawing solid particles from said upper compartment at a fourth location spaced longitudinally from said third location in the direction toward said first location, means repeatedly effecting relative movement of said screen and lower compartment along a path having vertical and horizontal components of which the horizontal component of the movement of said screen relative to the lower compartment during downward movement of the screen relative to the lower compartment is in the direction from said third location toward said fourth location, and means sealing said screen at the periphery thereof with respect to said lower compartment so that during said downward relative movement of the screen the liquid surges strongly upward through the screen to non-turbulently fluidize the solid particles, while, during upward relative movement of the screen the particles settle on the latter, and the particles traverse the screen longitudinally in the direction toward said fourth location during the repeated relative movements of said screen and lower compartment.

4. Apparatus according to claim 3; further comprising means for adjusting the relationship between said horizontal and vertical components of the relative motion to vary the rate at which the solid particles longitudinally traverse the screen.

5. Apparatus according to claim 3, wherein said housing is stationary and said screen is movable vertically and horizontally with respect to said housing; and wherein said means for effecting relative movement of said screen and lower compartment includes parallel swingable arms pivotally supporting said screen and movable between substantially vertical positions and inclined position, and means for oscillating said swingable arms between said vertical and inclined positions.

6. Apparatus according to claim 5; wherein said means for oscillating the swingable arms includes a connecting rod between said arms causing the latter to swing in unison, a linearly reciprocated actuating rod, and a longitudinally extensible and retractable coupling between said connecting and actuating rods for adjusting the range of the oscillation of said arms.

7. Apparatus according to claim 3; wherein said housing is stationary and said screen is movable vertically and horizontally relative to said housing; and wherein said means for effecting relative movement of said screen and lower compartment includes means for reciprocating said screen substantially in the vertical direction, and means effective to horizontally reciprocate said screen in response to the vertical reciprocation of the latter.

8. Apparatus according to claim 3; wherein said housing includes a lower wall at the bottom of said lower compartment free to move at least vertically relative to the remainder of said housing, means preventing vertical movement of said lower wall, and said screen is fixed relative to said remainder of the housing; and wherein said means for effecting relative movement of said screen and lower compartment includes means supporting said remainder of the housing for reciprocating movement along a substantially inclined path, and means for reciprocating said remainder of the housing along said inclined path.

9. A method of obtaining continuous countercurrent contact between solid adsorbent particles and a liquid solution, which comprises the steps of introducing liquid solution at one end of a pulsating swinging sieve jig, causing liquid solution to flow through the jig by withdrawing it at the opposite end of the jig, feeding in solid adsorbent particles to a compartment above the sieve at a position longitudinally apart from that at which the liquid solution enters the jig, forming a non-turbulent fluidized bed of the solid adsorbent particles by adjusting the pulsations of the jig, and cousing the solid adsorbent particles to traverse the screen in a direction opposite to that of the flow of liquid solution by removing the solid adsorbent particles from said compartment at a point longitudinally apart from that at which they are fed in the apparatus.

10. A method of obtaining continuous counter-current contact between solid adsorbent particles and a liquid solution as in claim 9; in which liquid solution is countercurrently contacted with a mixture of solid adsorbent particles which differ in their sedimentation velocities, and in which said particles are allowed to segregate into different layers and said layers are withdrawn as individual streams of the various component particles of the mixture.

References Cited in the file of this patent

UNITED STATES PATENTS

| 448,654 | Jantz | Mar. 24, 1891 |
|---|---|---|
| 804,841 | Hedburg | Nov. 21, 1905 |
| 1,162,112 | Standefer | Nov. 30, 1915 |
| 1,888,435 | Quackenbush | Nov. 22, 1932 |
| 2,143,610 | Muller | Jan. 10, 1939 |
| 2,193,957 | Alexander | Mar. 19, 1940 |
| 2,222,777 | Linke | Nov. 26, 1940 |
| 2,618,577 | Bash | Nov. 18, 1952 |
| 2,632,720 | Perry | Mar. 24, 1953 |

FOREIGN PATENTS

| 554,192 | Great Britain | June 24, 1943 |